United States Patent [19]

Koppensteiner

[11] 4,175,825
[45] Nov. 27, 1979

[54] OPTICAL TRANSMISSION SYSTEM WITH A PECHAN PRISM FOR EQUALIZING OPTICAL PATHS

[75] Inventor: Alfred H. Koppensteiner, Torrance, Calif.

[73] Assignee: Hughes Aircraft Company, Culver City, Calif.

[21] Appl. No.: 883,563

[22] Filed: Mar. 6, 1978

[51] Int. Cl.² .................... G02B 23/12; G02B 23/02
[52] U.S. Cl. ..................................... 350/34; 350/51; 350/10; 250/213 R
[58] Field of Search ............... 350/9, 10, 11, 32, 33, 350/34, 48–54, 21, 22, 23, 25, 26, 286, 287, 174, 2.1; 250/213 VT, 213 R

[56] References Cited

U.S. PATENT DOCUMENTS

| | | | |
|---|---|---|---|
| 2,453,336 | 11/1948 | Orser | 350/34 |
| 3,464,757 | 9/1969 | Schmidt et al. | 250/213 VT |
| 3,529,882 | 9/1970 | Schmidt | 350/1.2 |
| 3,574,459 | 4/1971 | Hartwig | 350/51 |

Primary Examiner—Jon W. Henry
Attorney, Agent, or Firm—Kenneth W. Float; W. H. MacAllister

[57] ABSTRACT

Couples an additional optical system to an existing system having viewing optics, including an eyepiece. A pivoted mirror reflects the image scene from the imaging optics of the existing system to the viewing optics. The added system transmits a second image scene through a Pechan prism to the mirror, which when pivoted to a second position, reflects it to the viewing optics. The prism has internal reflecting paths to increase the optical path length of the added system to equal the path length of the existing system so that both image scenes are in focus at the eyepiece. An image intensifier may be employed between the prism and the imaging optics of the added system to brighten the image, and a reticle may be placed at the output of the intensifier to provide for boresighting and alignment of the added system.

10 Claims, 2 Drawing Figures

OPTICAL TRANSMISSION SYSTEM WITH A PECHAN PRISM FOR EQUALIZING OPTICAL PATHS

The government has rights in this invention pursuant to Contract No. DAAK70-77-C-0107 awarded by the Department of the Army.

BACKGROUND OF THE INVENTION

It is commonplace in modern system design to require integration of several distinct optical subsystems into a completed product. Space limitations and packaging constraints place severe hardships on the optical and mechanical designer to marry complex subsystems into workable, functioning hardware. Typical of the problem situation is one in which the goal is to integrate an additional optical subsystem into an already defined or presently marketed production system. It is usually the case that the original system was designed with very little foresight contemplating addition of an extra subsystem into the existing package.

To accomplish the integration could require a major redesign effort of both the mechanical structure and major optical components. This process is both costly and time consuming, and if the system is functioning, it is best to leave well enough alone, for fear of creating new problems.

Typical problems encountered include limited packaging space; a requirement to couple the new system to a single set of output optics designed for the existing system, which implies that the optical designer is constrained by the parameters of that existing system; and the requirement is usually imposed that the existing system performance not be degraded by introduction of this new system.

Accordingly one object of the invention is to provide a compact optical transmission system for use in a limited volume as a means to couple a plurality of optical systems to a common output.

Another object of the invention is the provision of an optical transmission system having image enhancement and boresighting capability without affecting overall system performance and without degradation of any other subsystem performance.

SUMMARY OF THE INVENTION

In accordance with the invention, the optical transmission system provides a compact arrangement of optical components by which to optically couple several distinct optical subsystems to a common set of output optics while constrained by packaging restrictions and apparent optical mismatching problems. A typical situation might arise when attempting to integrate an independent optical system into an already existing production system.

The optical transmission assembly comprises imaging optics arranged to focus and efficiently couple the incoming light energy onto an image intensifier which enhances the image scene brightness at its output. The intensified image is then transmitted through a Pechan prism and then reflected from a mirror into the line-of-sight of the common output optics. Additionally, means for image enhancement and boresight and alignment may be made part of the system to provide maximum flexibility for a wide variety of applications. Such means for boresighting may be a reticle bonded to the intensifier output surface.

System compactness and optical compatibility is primarily accomplished by means of the Pechan prism. Given that the output optics would normally form an image plane to the left of the image intensifier output face, the Pechan prism is so designed as to increase the optical path length in the system, and by proper choice of prism size and glass density, an image plane can be formed coincident with the output surface of the image intensifier.

Thus, a compact system for coupling various optical systems to common output optics is now provided without degrading the existing system performance and providing optical enhancement and reticle provisions for boresighting and alignment.

BRIEF DESCRIPTION OF THE DRAWINGS

The novel features of this invention, as well as the invention itself, will be better understood from the following description taken in connection with the accompanying drawing in which like reference characters refer to like parts, and in which.

DETAILED DESCRIPTION

The optical transmission system of the present invention is employed to couple a plurality of optical systems to common viewing optics. The optical transmission system includes means providing image enhancement, boresight capability and alignment capability.

Figure 1:
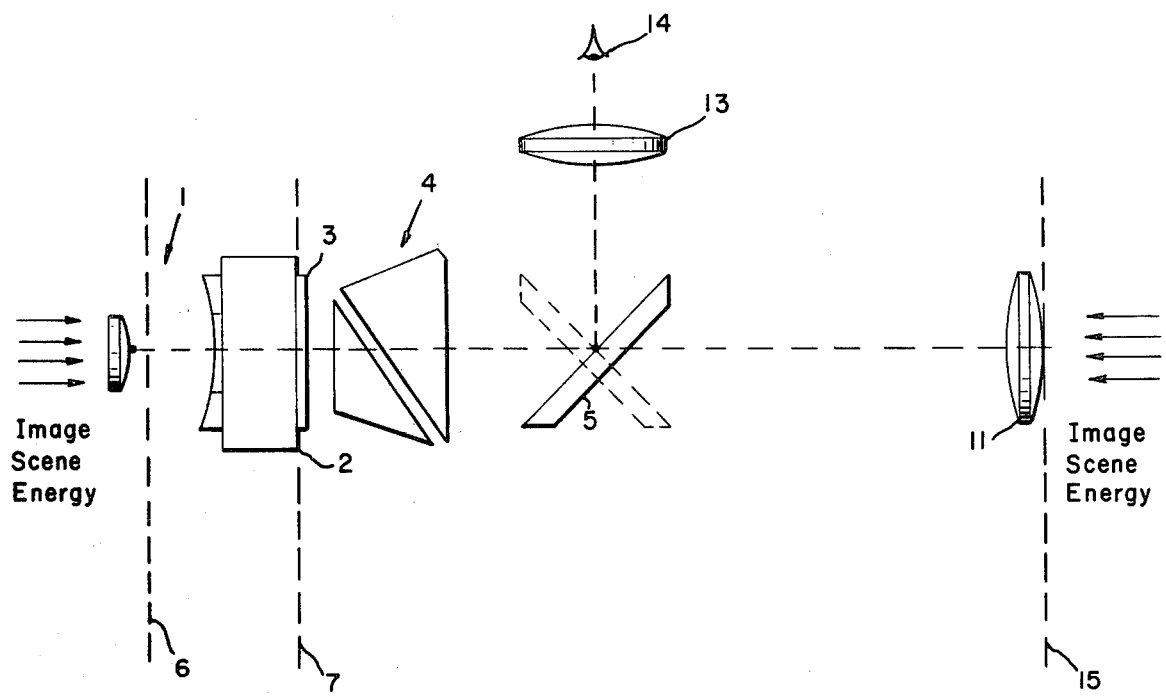
FIG. 1 is a schematic diagram of an optical transmission assembly in accordance with the invention.

In accordance with the invention, FIG. 1 is a schematic of the optical transmission system showing its relationship to an already existing system. The existing system has associated with it imaging optics 11, which focus light energy from an image scene into common viewing optics 13 and an eyepiece 14 in a manner in which the light energy is reflected from a pivoted mirror 5 (shown in the position indicated by the dashed lines in FIG. 1) interposed in the optical path of the existing system.

The incoming light energy of the image scene is in focus as viewed by the eyepiece 14 and common viewing optics 13 at a position in the optical path which is at focal plane 15. The fact that the existing system forms a focal plane 15 where it does in the existing system presents a problem which is solved by the optical transmission system of the present invention.

Referring now to the optical transmission system shown in FIG. 1, a different image scene is viewed by the optical transmission system by means of imaging optics 1 provided at the input end of the system. The imaging optics 1 focus and couple light energy from the image scene onto an image intensifier 2, such as an International Telephone and Telegraph 18 millimeter diode photocathode image intensifier.

The image intensifier 2 converts the light energy into electrical energy in the form of electrons and accelerates the electrons to higher energy levels. The accelerated electrons then impinge upon a target material which reconverts the electrical energy into light energy at a higher brightness level. Hence, a brighter image scene is produced at the output of the image intensifier 2.

The light energy leaving the image intensifier 2 passes through a reticle 3 which may be bonded to the output side of the image intensifier 2. The reticle 3 is provided as a means to boresight and align the optical transmission system.

Figure 2:
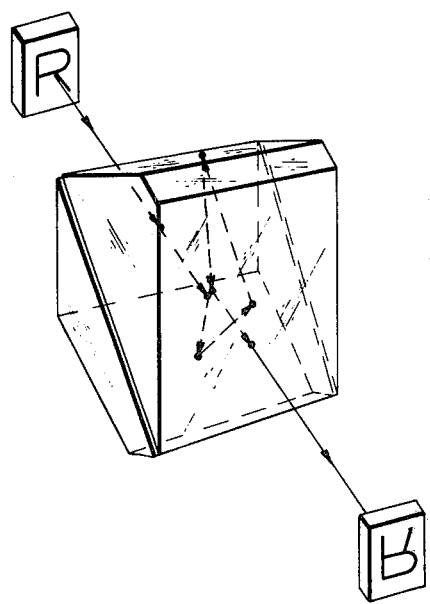
FIG. 2 shows the optical path traversed by the light energy as it passes through the Pechan prism of the optical transmission assembly of FIG. 1.

The light energy then passes through a Pechan prism 4, wherein the light energy traverses a path through the prism 4 indicated in FIG. 2. A Pechan prism 4 is essentially two modified right angle prisms mounted with their unsilvered surfaces together separated by a small air gap.

Use of the Pechan prism 4 increases the optical path length of the optical transmission system since the light energy is reflected from five surfaces within the prism 4, and consequently travels approximately three times the distance within the prism 4 than would occur in a device without internally reflecting surfaces or in free air. In addition, as a consequence of the inherent design of the prism 4, the image scene is inverted about a horizontal axis, as indicated by the letter R in FIG. 2.

The light energy is then reflected from the mirror 5, pivoted to the position indicated as the solid outline in FIG. 1, to reflect images transmitted by the optical transmission system through the common viewing optics 13 and eyepiece 14. The mirror 5 is pivoted so as to allow mechanical motion such that it can be positioned to reflect either optical signals from the optical transmission system or the existing system into the line-of-sight of the common viewing optics 13.

To optically couple the existing system to the independent systems by means of the optical transmission system, it is necessary for the common viewing optics 13 and eyepiece 14 to view a focussed image at the output side of the image intensifier 2.

Normally the focal plane created by the common viewing optics 13 and eyepiece 14 would occur at focal plane 6, which implies that any image created by the image intensifier 2 would be entirely out of focus. However, the Pechan prism 4 is designed so that an optical path length through the prism 4 forms a focal plane at the correct position, which is focal plane 7.

Additionally, folding the optical path by means of the Pechan prism 4, creates a very compact means by which to transmit light energy. Also, use of the image intensifier 2 allows image enhancement for coupling low-level light energy input to the optical transmission system and transmitting a brighter more visible image from the system.

If the image scene light energy is bright enough to be clearly visible at the eyepiece 14 under all conditions, the imaging optics 1 and image intensifier 2 may not be necessary and may be eliminated. A means for securing and holding the reticle 3 would be required in the absence of the image intensifier 2 to locate the reticle 3 at the desired focal plane 7. Elimination of the imaging optics 1 assumes that the independent system has suitable optics so as to focus its output at the focal plane 7. This alternative system provides a very compact means for coupling two systems together.

Thus, the invention provides a solution for the problem of coupling an independent optical system to an existing optical system which allows use of common viewing optics for both systems and provides image enhancement and boresight and alignment capability for the independent system.

Although the invention has been described with reference to particular embodiments thereof, it should be realized that various changes and modifications may be made therein without departing from the spirit and scope of the invention.

What is claimed is:

1. An optical transmission system for selectively applying optical signals from a plurality of input paths to a common output path such that the paths from a viewing point in said output path to respective focal planes associated with said optical signals transmitted along said input paths are substantially the same, comprising:
   means for selectively applying said optical signals from one of said input paths to said output path; and
   a Pechan prism disposed in one of said input paths and having an effective air equivalent path length so as to equalize the paths from said viewing point to said respective focal planes.

2. An optical transmission system for intensifying and applying optical signals from a first input path of a plurality of input paths to a common output path such that said optical signals from said first input path are substantially intensified, and such that the paths from a viewing point in said output path to respective focal planes associated with said optical signals transmitted along said plurality of input paths are substantially the same, comprising:
   means for intensifying said optical signals associated with said first input path;
   a Pechan prism disposed in one of said input paths having an effective air equivalent path length so as to equalize said paths from said viewing point to said respective focal planes; and
   means for selectively applying said input paths to said output path.

3. An optical coupling arrangement comprising:
   viewing optics;
   first and second imaging optics having respective focal planes occurring at different distances from said viewing optics;
   a pivoted mirror disposed between said viewing optics and said first and second imaging optics, said mirror having first and second positions, said mirror in said first position reflecting a first image scene from said first imaging optics to said viewing optics, said mirror in said second position reflecting a second image scene from said second imaging optics to said viewing optics; and
   a Pechan prism disposed between said mirror and one of said first and second imaging optics and having an air equivalent optical path so as to equalize the length of the optical paths from said viewing optics to said respective focal planes of said first and second imaging optics.

4. An optical coupling arrangement for coupling a second optical system having second imaging optics with a focal plane to a first optical system having first imaging optics with a focal plane, viewing optics and an eyepiece, said arrangement comprising:
   a pivoted mirror having first and second positions, said mirror being disposed between said viewing optics and said first and second imaging optics, said mirror in said first position reflecting a first image scene from said first optical system to said viewing optics and said eyepiece, said mirror in said second position reflecting a second image scene from said second optical system to said viewing optics and said eyepiece; and
   a Pechan prism having a plurality of internal reflecting paths disposed between said mirror and said second imaging optics for increasing the path length from the focal plane of said second optical system to said eyepiece so that said path length substantially equals the path length from the focal plane of said first optical system to said eyepiece whereby said first and second image scenes are both in focus at said eyepiece.

5. An optical coupling arrangement for coupling a second optical system having second imaging optics with a focal plane to a first optical system having first imaging optics, with a focal plane viewing optics and an eyepiece, said arrangement comprising:
a pivoted mirror having first and second positions disposed in the optical path between said first imaging optics and said viewing optics, said mirror in said first position being disposed to reflect a first image scene from said first optical system to said viewing optics and said eyepiece;
a Pechan prism;
said second imaging optics of said second optical system coupling a second image scene to the input of said Pechan prism;
said pivoted mirror in said second position being disposed to reflect said second image scene from the output of said Pechan prism to said viewing optics and said eyepiece; and
said Pechan prism having a plurality of internal reflecting paths to increase the length of the optical path from the focal plane of said second optical system to said eyepiece so that said path length substantially equals the length of the path from the focal plane of said first optical system to said eyepiece, whereby said first and second image scenes are both in focus at said eyepiece.

6. An optical transmission system comprising:
a first optical system having a focal plane, first imaging optics, viewing optics and an eyepiece;
a pivoted mirror having first and second positions disposed in the optical path between said first imaging optics and said viewing optics, said mirror in said first position being disposed to reflect a first image scene from said first optical system to said viewing optics and said eyepiece;
a second optical system having second imaging optics with a focal plane, an image intensifier, a reticle and a Pechan prism, said second imaging optics focussing a second image scene on the input of said image intensifier, said reticle being disposed at the output of said image intensifier, the output image of said image intensifier being applied to the input of said Pechan prism;
said pivoted mirror in said second position being disposed to reflect said second image scene from the output of said Pechan prism to said viewing optics and said eyepiece;
said Pechan prism having a plurality of internal reflecting paths to increase the length of the optical path from said focal plane of said second optical system to said eyepiece, so that said path length substantially equals the length of the path from said focal plane of said first optical system to said eyepiece, whereby said first and second image scenes are both in focus at said eyepiece;
said image intensifier serving to brighten said second image scene; and
said reticle serving to provide capability for boresighting and alignment of said second optical system.

7. An optical transmission system for selectively applying optical signals from a plurality of input paths to a common output path such that the paths from a viewing point in said output path to respective focal planes associated with said optical signals are substantially the same length, comprising:
a pivoted mirror disposed for selectively applying one of said input paths to said output path; and
a Pechan prism interposed in said one of said input paths and having an effective air equivalent path length so as to equalize the lengths of said paths from said viewing point to said respective focal planes;
whereby light energy from an image scene is transmitted by said Pechan prism which increases the length of the optical path between said viewing point and the focal plane of said one input path in a manner so as to equalize the length of the optical path from said viewing point to said respective focal planes.

8. An optical transmission system for selectively coupling optical signals from an additional optical system or an existing optical system to common viewing optics such that optical paths from a viewing point in said common viewing optics to respective focal planes associated with said existing system and said optical transmission system are substantially the same length, comprising:
a pivoted mirror for selectively reflecting said optical signals from either said existing system or said additional system into the line-of-sight of said common viewing optics; and
a Pechan prism interposed in said optical path of said optical transmission system between said common viewing optics and said additional system, having an effective air equivalent path length so as to equalize said optical paths from said viewing point to said respective focal planes;
whereby light energy transmitted by said additional system is further transmitted by said Pechan prism, which increases the length of the optical path between said viewing point and the focal planes of said optical transmission system by reflecting said light energy from five internal surfaces so as to equalize the length of the optical path from said viewing point to the focal plane of said optical transmission system with the length of the optical path from said viewing point to said focal plane of said existing optical system, said light energy being reflected from said pivoted mirror into the line-of-sight of said common viewing optics, thus forming a focussed image at said viewing point.

9. An optical transmission system for focussing, intensifying and coupling boresighted optical signals from an additional optical system to common viewing optics of an existing optical system such that optical paths from a viewing point in said common viewing optics to respective focal planes associated with said optical transmission system or said existing optical system are substantially the same length, comprising:
an image intensifier for receiving said optical signals associated with said additional optical system and producing brightened optical signals at the output thereof;
imaging optics for focussing said optical signals associated with said additional optical system onto the input of said image intensifier;
a reticle bonded to the output of said intensifier and positioned coincident with the focal plane of said optical transmission system for boresighting said additional optical system;

a Pechan prism optically aligned with said image intensifier for receiving said brightened optical signals from the output thereof, said brightened optical signals being reflected from five internal surfaces of said Pechan prism resulting in an effective air equivalent path length so as to equalize the optical path from said viewing point to said focal plane of said optical transmission system with the optical path from said viewing point to the focal plane of said existing optical system; and a pivoted mirror interposed in such a position with respect to said existing system and said optical transmission system as to selectively reflect optical signals transmitted by either of the systems into the line-of-sight of said common viewing optics;

whereby light energy from an image scene transmitted by said additional system is focussed by said imaging optics and coupled to said image intensifier in which said image is brightened and transmitted through said reticle and said Pechan prism and reflected from said mirror into the line-of-sight of said common viewing optics, said Pechan prism increasing the length of the optical path between said viewing point and said intensifier, thus shifting said focal plane of said optical transmission system from a point prior to said image intensifier in the optical path to a point located at the output of said intensifier, thus focussing a clear image at said viewing point.

10. An optical transmission system for focussing, intensifying and applying boresighted optical signals from a first input path of a plurality of input paths to a common output path, such that optical paths from a viewing point in said output path to respective focal planes associated with said plurality of inputs paths are substantially the same length, comprising:

an image intensifier for receiving said optical signals associated with said first input path and producing brightened optical signals at the output thereof;

imaging optics for focussing said optical signals associated with said first input path onto the input of said image intensifier;

a reticle bonded to the output of said intensifier and positioned coincident with the focal plane of said first input path for boresighting said system;

a Pechan prism optically aligned with said image intensifier for receiving said brightened optical signals from the output thereof, said brightened optical signals being reflected from five internal surfaces of said Pechan prism resulting in an effective air equivalent path length so as to equalize the length of said first input path from said viewing point to said respective focal plane with the lengths of said optical paths of the remaining paths of said plurality of input paths; and a pivoted mirror interposed in such a position with respect to said plurality of input paths as to selectively apply said input paths to said common output path;

whereby light energy from an image scene is focussed by said imaging optics and coupled to said intensifier in which said image is brightened and transmitted through said reticle and said Pechan prism and reflected from said pivoted mirror into said output path, said Pechan prism increasing the length of the optical path between said viewing point and said intensifier, thus shifting said focal plane of said first input path from a point prior to said image intensifier in the optical path to a point located at the output of said intensifier, thus focussing a clear image at said viewing point.

* * * * *